(12) United States Patent
Saint-Vincent

(10) Patent No.: US 9,795,900 B2
(45) Date of Patent: Oct. 24, 2017

(54) PROCESS AND APPARATUS FOR IN-LINE DEGASSING OF A HETEROGENEOUS FLUID USING ACOUSTIC ENERGY

(71) Applicant: Stephen Saint-Vincent, New Braunfels, TX (US)

(72) Inventor: Stephen Saint-Vincent, New Braunfels, TX (US)

(*) Notice: Subject to any disclaimer, the term of this patent is extended or adjusted under 35 U.S.C. 154(b) by 262 days.

(21) Appl. No.: 14/596,947

(22) Filed: Jan. 14, 2015

(65) Prior Publication Data

US 2016/0199756 A1    Jul. 14, 2016

(51) Int. Cl.
*B01D 19/00*    (2006.01)

(52) U.S. Cl.
CPC ..... *B01D 19/0078* (2013.01); *B01D 19/0005* (2013.01); *B01D 19/0063* (2013.01)

(58) Field of Classification Search
CPC ............ B01D 19/0078; B01D 19/0063; B01D 19/0005
See application file for complete search history.

(56) References Cited

U.S. PATENT DOCUMENTS

| | | | | |
|---|---|---|---|---|
| 5,372,634 A * | 12/1994 | Monahan | ........... | B01D 19/0078 95/30 |
| 5,508,975 A * | 4/1996 | Walter | ........... | B01D 19/0078 210/188 |
| 5,824,136 A * | 10/1998 | Meline | ........... | B01D 49/006 55/318 |
| 5,849,064 A * | 12/1998 | Marco | ........... | G01N 1/28 95/260 |
| 5,885,424 A * | 3/1999 | Davis | ........... | B01D 17/0208 204/157.15 |
| 6,210,470 B1 * | 4/2001 | Philips | ........... | B01D 19/0078 95/30 |
| 6,620,226 B2 * | 9/2003 | Hutton | ........... | B01D 19/0078 95/30 |
| 2003/0230193 A1 * | 12/2003 | Louks | ........... | B01D 19/0021 95/30 |
| 2008/0163752 A1 * | 7/2008 | Williams | ........... | B01D 19/0078 95/30 |
| 2009/0137941 A1 * | 5/2009 | Lynch | ........... | A61M 1/3627 604/6.11 |
| 2009/0199708 A1 * | 8/2009 | Milo | ........... | A61M 1/3627 95/30 |

(Continued)

OTHER PUBLICATIONS

F. John Fuchs, "Ultrasonic Cleaning: Fundamental Theory and Application", Mar. 1, 1995, Nasa Technical Reports Server, Conference Paper, p. 373-374 https://web-beta.archive.org/web/20170309082606/https://ntrs.nasa.gov/archive/nasa/casi.ntrs.nasa.gov/19950025362.pdf.*

*Primary Examiner* — Amber R Orlando
*Assistant Examiner* — Britanny Precht
(74) *Attorney, Agent, or Firm* — Camille L. Urban; BrownWinick Law Firm

(57) ABSTRACT

An inline process for imparting sonic energy plus a liquid gas separator to a continuous flow of a heterogenous liquid to de-gassify the liquid and thereby provide for separation and extraction of selected liquid and gas components. The device utilizes a flat plate oriented in the direction of flow within the liquid so as to impart pressure fronts into the liquid to initiate liquid gas separation followed by a series of weirs, and tower packing, with stripping gas to facilitate mass transfer.

10 Claims, 4 Drawing Sheets

(56) References Cited

U.S. PATENT DOCUMENTS

| | | | | |
|---|---|---|---|---|
| 2012/0006762 A1* | 1/2012 | McCabe | ............ | B01D 19/0036 |
| | | | | 210/801 |
| 2012/0279396 A1* | 11/2012 | Brammer | ........... | B01D 19/0005 |
| | | | | 95/263 |
| 2013/0333560 A1* | 12/2013 | Mcculloch | ......... | B01D 53/1425 |
| | | | | 95/30 |
| 2015/0090117 A1* | 4/2015 | Baggerud | .............. | B01D 53/22 |
| | | | | 95/30 |
| 2015/0344326 A1* | 12/2015 | Van Der Heijden | ..... | C02F 1/20 |
| | | | | 210/603 |

* cited by examiner

PROCESS AND APPARATUS FOR IN-LINE DEGASSING OF A HETEROGENEOUS FLUID USING ACOUSTIC ENERGY

BACKGROUND OF INVENTION

There are numerous heterogeneous liquids that are comprised of constituents that have differing vapor pressure, wherein liquid and gas phases can be formed and preferentially separated. The high vapor pressure components are disbursed, and or solubilized throughout a bulk, low vapor pressure carrier liquid. Some of these heterogeneous liquid streams may contain commercially saleable liquid and gasses if the plurality of stream components can be separated and extracted at a reasonable rate and cost. Examples of separations of such heterogeneous liquids include the extraction of light end hydrocarbons (C1-C5; methane, ethane, propane, butane, and pentane and related species) from Crude Petroleum as produced at the wellhead, or other liquids.

The recent proliferation of Oil & Gas Production from Shale type formations 25 yield liquid product that has high Reid Vapor Pressure. These crude petroleum liquid products are not safe to transport. Therefore, expensive stabilization processes are required to extract the light end hydrocarbons to render the crude petroleum safe for transportation.

Current state of the art crude petroleum stabilization process facilities require the use of large, complex gas compression and expansion equipment along with large thermal transfer apparatus for chilling various vapor streams for subsequent condensation and recovery. These facilities are very capital intensive. Additionally, stabilization facilities require large scale processing to make the per unit volume processed economically viable. These crude oil stabilization facilities must, therefore, be constructed at collection gathering facilities and/or pipeline terminals.

High residual Reid Vapor Pressure of the crude oil produced by tight oil/shale type formations are characterized by having a substantial quantity of retained natural gas constituents of C1-C5 (methane, ethane, propane, butane, and pentane and other derivative species). The surface handling of these liquids between the wellhead and the stock tank typically utilize various means of lowering the fluid pressure to atmospheric. At each stage of pressure reduction, a quantity of gas is released. The final pressure drop stage to atmospheric pressure can yield in excess of 20 standard cubic feet per gallon of rich gas. This volume of rich gas vapor is typically released to the atmosphere contributing ozone-forming, ground level pollution.

U.S. Pat. No. 5,538,628, Logan; James R. (Moline, Ill.) describes a device for imparting sonic energy to a continuous flow of an emulsified liquid to de-emulsify the liquid and thereby provide for separation and extraction of selected liquid components. The device utilizes a flat plate oriented in the direction of flow within the liquid so as to impart pressure fronts into the liquid to produce the separation.

U.S. Pat. No. 5,885,424, Davis; R. Michael (Fort Worth, Tex.), Hadley; Harold W. (Olds Alberta, Calif.), Paul; James M. (DeSoto, Tex.) describes a method for breaking an emulsion comprising oil and water into oil and water phases comprising treating the emulsion with a chemical demulsifier and passing the mixture through a hollow chamber having a uniform cross-section and subjecting the mixture to acoustic energy in the frequency range of about 0.5 to 10.0 kHz, preferably 1.25 kHz, to enhance breaking the emulsion into a water phase and oil phase. The oil phase is then separated from the water phase by gravity separation and recovered. The sonic energy is generated by a transducer attached to the mid-section of the upper or lower outer surface of the hollow chamber. For emulsions containing light oil having an API gravity greater than 20 and water, the emulsion can be broken by the use of acoustic energy in the frequency range of about 0.5 to 10.0 kHz without the addition of chemical demulsifiers.

U.S. Pat. No. 6,090,295, Raghavarao, et al., describes a method and apparatus for demixing an aqueous solution. The aqueous solution has at least two aqueous phases. The method comprises applying acoustic energy to the aqueous solution. The apparatus comprises a mechanism for applying acoustic energy to the aqueous solution until the aqueous solution is demixed to clarity.

U.S. Pat. No. 5,372,634 Raghavarao; Karumanchi S. M. S. (Boulder, Colo.), Todd; Paul W. (Boulder, Colo.) There is presented a sonic apparatus for degassing liquids. The apparatus includes a vessel for receiving and releasably retaining an open-top container and adapted to be closed with the container therein, transducer suspension structure positioned in the vessel, an ultrasonic transducer suspended from the structure and disposed in the container spaced from the walls and bottom of the container and beneath the surface of a liquid contained therein. The apparatus further includes a signal generator outside of the vessel for transmitting power to the transducer, and a vacuum pump for maintaining the vessel interior at a vacuum.

U.S. Pat. No. 4,428,757-Hall; Mark N. (College Place, Wash.) describes a gas stabilization unit that eliminates unwanted gaseous material and adds desired gaseous material from a fluid stream by applying sonic vibrations in two stages to create readily removable bubbles of the gaseous material. A siphon assembly located downstream removes the bubbles.

U.S. Pat. No. 4,371,385, Johnson; Steven H. (Lakewood, Colo.) describes a process where a liquid deaeration apparatus having a deaeration chamber, a positive displacement pump downstream of the deaeration chamber, a first flow restrictor upstream of the deaeration chamber, a low pressure sink connected to an air outlet of the deaeration chamber, and a second flow restrictor between the pump and the liquid outlet of the deaeration chamber to raise the pressure at the liquid outlet above that at the air outlet to cause volatilized gas to be removed via the air outlet of the deaeration chamber.

U.S. Pat. No. 4,070,167 Barbee; Eugene Hartzell (East Rochester, N.Y.), Brown; Robert Cushman (Rochester, N.Y.) describes a process where bubbles are eliminated from a liquid such as a photographic emulsion by passing the emulsion through a horizontal tubular container while pulling a vacuum on the container and subjecting the emulsion to ultrasonic vibrations from an ultrasonic transducer having a horn located in a well in the bottom of the container. Emulsion is pumped out of the container and delivered through a conduit to the point of use. The delivery circuit can include a secondary gas separation chamber which also has a transducer horn therein. Provision is made for selectively recycling part or all of the emulsion back into the well. The container can be operated either partly full or completely full of liquid. Provision is also made for cleaning the internal walls of the apparatus by injecting a swirling stream of liquid into the tubular container to flow through the container and downstream portions of the system.

U.S. Pat. No. 8,133,300 B1, Grant; describes in some embodiments, a chamber may be configured to separate oil and gas. For example, the oil and gas may be separated as they exit a compressor, an oil storage tank, etc. In some embodiments, the gas may be a heavy gas and the oil may be compressor oil. One or more heated baffles may interact with the oil and gas to increase the velocity of the gas flow to inhibit the gas from absorbing into the oil. In some embodiments, when the compressor feeding the chamber is operating at a decreased compression rate, the chamber may continue to heat the oil to vaporize impurities out of the oil. The impurities may then be vented out of the chamber through the bleed valve to a gas inlet scrubber.

SUMMARY OF INVENTION DESCRIPTION

Many current Oil & Gas production processes between the final separator and the liquid storage vessels have minimal control of flash off gases. These uncontrolled flash off gases are of concern for economic productivity, safety and environmental reasons. This flash off gas also can be the most valuable natural gases, in that the energy content can be as high as 2,500 BTU/scft. The estimated quantity of flash off gases is on the order of 26.6 Bcf/year in the continental United States[i]. Studies have shown that uncontrolled vapor loss is costing Producers between 5-15% of TOTAL revenue.

The main objective of this invention is to describe an inline process for the treatment of heterogeneous fluids for the economical separation of light end hydrocarbons, C1-C5 from liquid crude petroleum streams.

In accordance with the present invention, there is provided a method for degassing fluid streams wherein the immediate description of the present invention is an inline process wherein the process consists of a flow accumulator, sonic processor, an acoustic wave guide fluidly connected to the sonic processor and a flow decelerator terminating in a continuous weir, a process tower wherein resides a liquid distributor, column packing wherein liquid flows counter to vapor flow, a means of introducing a stripping gas, and a means of exhausting gas streams separate from liquid streams, and means controlling flow and pressure throughout the process.

Acoustic Emulsion Breaking (AEB) is a phenomenon that is observed in which a fluid with dissolved gases are subjected to acoustic pressure. Gas transport from the bulk liquid to bubbles is a unidirectional process driven by two physical mechanisms: Henry Law and Secondary Bjerknes Forces.

Acoustic pressure waves consist of a pressure oscillation about a mean pressure. The pressure oscillation consists of a compression and rarefaction phase. During the rarefaction phase, the pressure in the liquid is reduced permitting high vapor pressure constituents to form bubbles. During this rarefaction phase, each bubble's surface/volume ratio is greater as the bubble expands than as it contracts (the surface of the expanded bubble is much higher than that of the compressed bubble).

The expanding bubble internal pressure is below the fluid pressure, thus gas is diffused into the bubble. As a result, the bubble draws more gas into its interior during its expansion then it releases during contraction and, therefore, quickly increases in size. This process is called "directed" or "rectified" diffusion. The bubbles are uniformly distributed in the liquid and have a high total surface area, the migration of the dissolved gasses into them is fast and homogeneous throughout the affected liquid volume. The result is the formation of a large number of oscillating bubbles containing the gasses that were previously dissolved in the liquid medium.

Secondary Bjerknes force is a phenomenon where two (2) objects immersed in a fluid subjected to an acoustic pressure, oscillating with the same phase in an acoustic field experience an attractive force. This attractive force causes the objects to coalesce where they combine, forming larger bubbles. Due to the large number of bubbles formed from the pressure oscillation, the coalescence is very rapid. The large bubble size then provides sufficient buoyancy to rise to the surface of the liquid and disengage.

Disengaging the gas phase from the liquid is accomplished using well-known physics relating to Stokes' Law where the force between the gas bubble and liquid is:

$$F_g = (\rho_p - \rho_f) g \frac{4}{3} \pi R^3$$

The terminal velocity between the fluid and gas bubble is:

$$v_s = \frac{2}{9} \frac{(\rho_p - \rho_f)}{\mu} g R^2$$

where:
$\rho_p$—density of the gas phase (kg/m$^3$)
$\rho_f$—density of the liquid phase (kg/m$^3$)
g—gravity (m/s$^2$)
R—radius of the bubble (m)
μ—dynamic viscosity (kg/m·s)
Since $\rho_p \ll \rho_f$, the $F_g$ is opposite the force of gravity.

As the bubble diameter increases as a result of bubble coalescence, the bubble velocity will increase relative to the liquid as well.

Typical crude petroleum liquids produced from shale type formations have high Reid Vapor Pressure (RVP) and American Petroleum Institute (API) Gravity. High RVP values in the crude petroleum product relate to high vapor pressure of light end hydrocarbons. High API Gravity crude petroleum liquids, also called Natural Gasoline Liquids or Crude Condensate related to low specific gravity relating to the majority of the hydrocarbon species are between $C_5$ and $C_{40}$.

High RVP in the liquid crude petroleum products produced from shale formation is the resultant of a high concentration of light end hydrocarbons<$C_6$ in the liquid 130 product. The boiling point of the<C4 components are below 0° C., with vapor pressures well above atmospheric, greater than 861.9 kPa at 10° C. (25 psi at 50° F.)

Conventional Oil & Gas Production involves the process of reducing the pressure in the produced fluids from reservoir pressure to a pressure suited for Gas distribution and Liquid storage. At each stage of pressure reduction, a quantity of gas is released from the liquid. However, at the final stage of pressure reduction to atmospheric pressure, there is still substantial quantity of gas that will be released overtime as the liquid petroleum product weathers in stock tank storage, transportation, etc.

It is the main objective of this invention to demonstrate a means of introducing acoustic energy into the liquid product stream containing residual or stranded gas whereby (1) the acoustic energy causes the stranded gas to come out of solution and then (2) a means of causing the separate liquid and gas phases to undergo a series of process stages whereby the liquid and gas phases disengage from each other and are subsequently processed as two independent products.

A further objective of the present invention is to disclose a means of modulating surge output from the final separator by incorporating an accumulator wherein high velocity surge output from the final separator is stored, wherein the discharge from the accumulator is stabilized to a rate that is the time averaged mean of the periodic input of the final separator to the accumulator.

A further objective of the present invention is to disclose a means of utilizing an acoustic source to introduce the acoustic energy into the liquid stream and wherein the piping dimensions conform to the principles of a waveguide.

A further objective of the present invention is to disclose a means of decelerating the liquid velocity in the pipe, by means of a fluid conduit in which the cross sectional area is increased and wherein the final diameter of the fluid conduit is proportional to the acoustic input energy.

A further objective of the present invention is to disclose a means of changing the fluid momentum in such a manner that the acoustically formed gas phase is disengaged from the liquid.

A further objective of the present invention is to disclose a means of providing a column wherein internal structures facilitate liquid and gas phase separation while operating at a preferential pressure to optimize the hydrocarbon species in both the gas and liquid phases.

A further objective of the present invention is to disclose a means of providing column packing with large surface area with respect to the occupied volume of the packing within the column, as it passes through the packing thereby increasing the liquid's surface area so that remaining volatile gas vapor can be released from the liquid. Additionally, a further objective of this present invention is to introduce a stripping gas flowing counter current to the liquid for carrying the released gas vapor away.

Control of the fluid through the process is accomplished by flow regulating control valves at the output of the input accumulator, and output of the process tower. Flow control valve position is modulated via level sensor input and a programmable logic controller (PLC). The PLC accepts signal input from the level sensor and a flow meter on the output of the input accumulator, where algorithms calculate the optimal valve position to maintain constant output flow from the input accumulator that is a time average of the variable input to the input accumulator.

Pressure is controlled in the process stages by means of a pressure control regulator at each stage to maintain suited pressure for the transfer of related fluid streams to their respective discharge and/or collection points.

The present invention incorporates a means of decelerating the liquid velocity after it passes through the acoustic reaction chamber where the oscillating pressure causes gas bubbles to expand due to "directed" diffusion. Decelerating the liquid velocity enables sufficient time for bubble size growth and acceleration with respect to the liquid phase.

The deceleration is accomplished by means of a fluid conduit having a substantially conically shaped section where the inlet area is much smaller than the exit. This conical section is oriented in the vertical direction so that the net velocity of the bubble is greater than the liquid phase. The conical section terminates into a circular (continuous) weir where the liquid is thus thinned as it flows over the edge of the weir. This weir edge causes the liquid to undergo a sharp change in direction, further causing the gas bubbles to be ejected from the liquid.

Imparting acoustic energy to the fluid under process is by means of an acoustic source coupled to an acoustic radiation surface or a plurality of acoustic radiation surfaces. The means of acoustic source may be by solid-state transduction such as Piezo-electric, Magnetostrictive, or Electro-Dynamic.

The fluid conduit leading into the acoustic source is constructed to perform as an acoustic wave-guide, where the conduit cross-sectional dimension is less than ½ wavelength. The length of the fluid conduit on the input side is of sufficient length to support standing wave modes coincident with the primary acoustic frequency utilized for the source.

The fluid conduit carrying the fluid after the acoustic source is modeled after a wave-guide with an acoustic horn. The geometry of the horn can be of any configuration as long as the fluid conduit length is such that is supports a standing wave at the primary acoustic source frequency.

The present invention also utilizes a liquid distributor in the processing column. The liquid distributor is configured in such a manner that the liquid is uniformly distributed to the column packing below. The liquid distributor also incorporates a circular weir that acts as a second means of causing a momentum change in the liquid where any residual gas phase bubbles can be disengaged from the liquid.

A section of column packing is the final processing step where the column is filled with a minimum height of either structured or random packing and substantially increases the surface area of the liquid under process. These types of packing are typically used in distillation or absorption towers. The column packing shape is optimized to minimize liquid hold up and pressure drop across packing section.

Column packing elements whether random or structured are normally employed in gas-liquid columns to provide mass transfer surfaces between a downwardly flowing liquid stream, and an upwardly ascending gas or vapor stream. Generally, packing elements have a specific geometric shape and are designed to maximize performance for a given mass transfer surface area. It is desirable for the packing elements to have both high mass transfer efficiency and good hydraulic capacity when positioned in within the packed bed.

The packing bed is supported by a support plate that physically supports the packed bed, liquid hold-up, and trapped solids. The support plate has high percentage of open area to permit unrestricted countercurrent flow of liquid and vapor. The support plates are designed to handle the flow rate of the specified column.

The Process Tower also has means of introducing stripping gas below the column packing. The stripping gas injection is used to carry away remaining volatiles from 260 the liquid descending through the packing.

Control of the liquid and gas phase flow away from the Process Tower is by means of throttling valves. The liquid phase flow is controlled via a flow control valve whose position is controlled via level sensor in the Process Tower and a control algorithm. Gas phase flow is controlled by means of a pressure regulator valve wherein a desired pressure is maintained in the Process Tower. The pressure in the Process Tower optimization can be to provide sufficient pressure to transport the liquid phase to storage vessels.

Gas discharge from both the Accumulator and Process Tower is optimally to a Vapor Recovery Unit that will process the gas phase for subsequent distribution.

Figure 1:
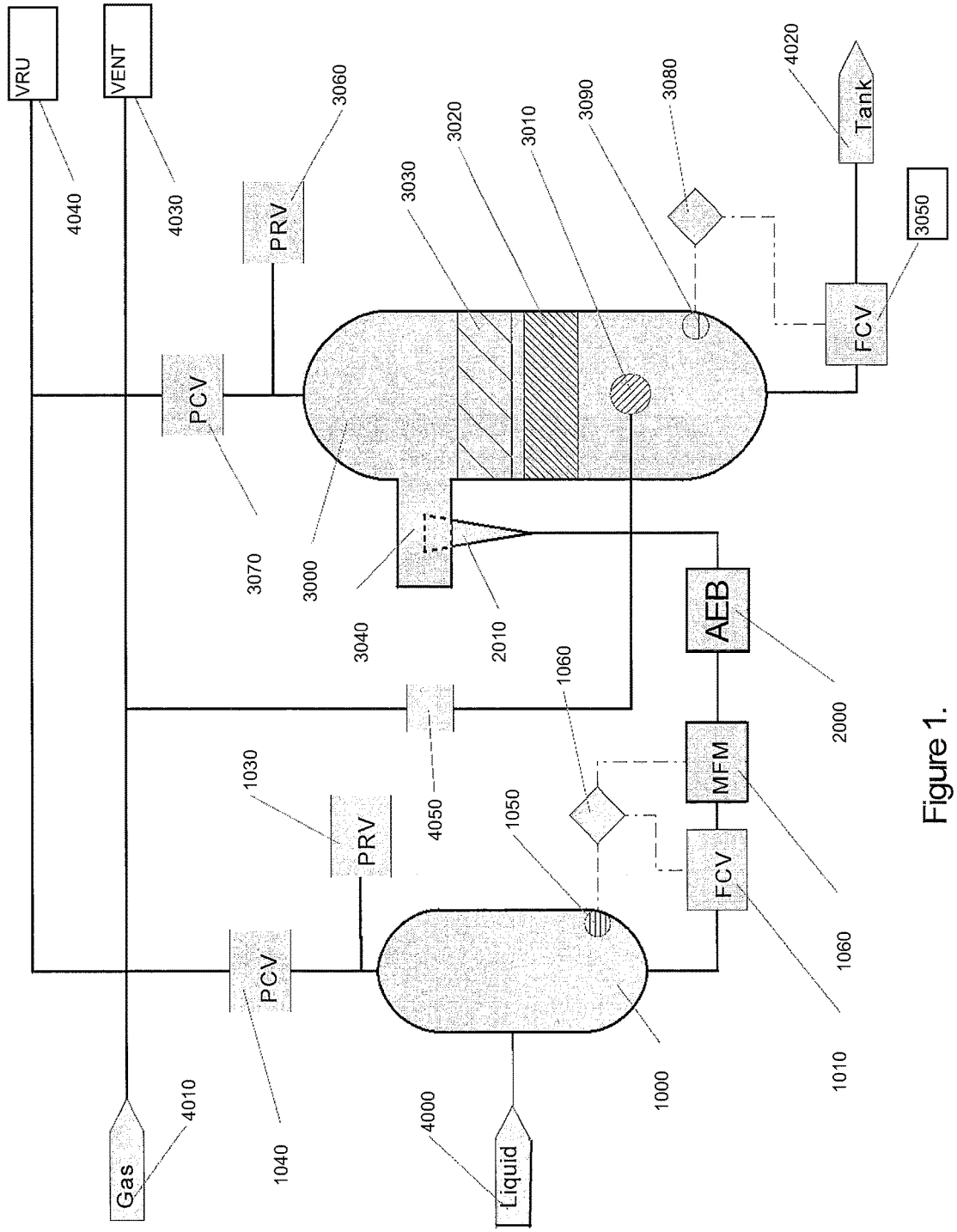
FIG. 1 is an illustration of the heterogeneous fluid degassing process, process vessels, piping, valves, instrumentation, and process tower internals.
Figure 2:
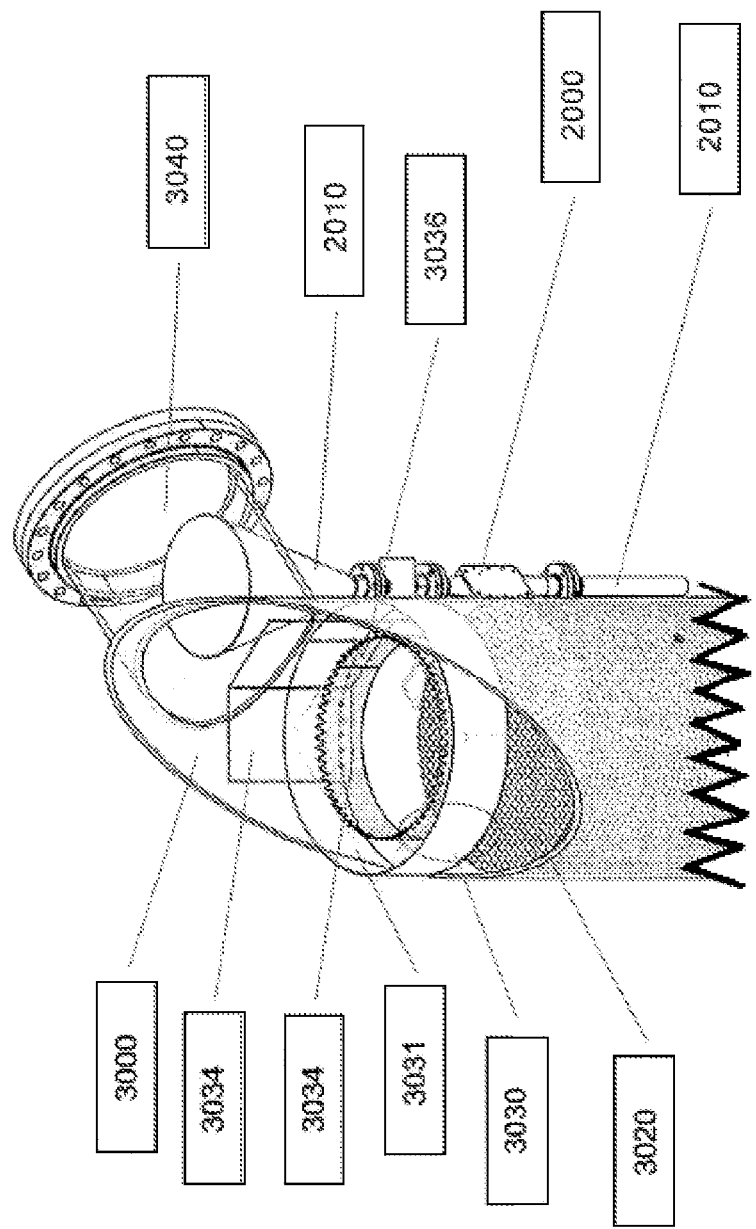
FIG. 2 depicts the sectional view of the Process Tower showing tower internals.
Figure 3:
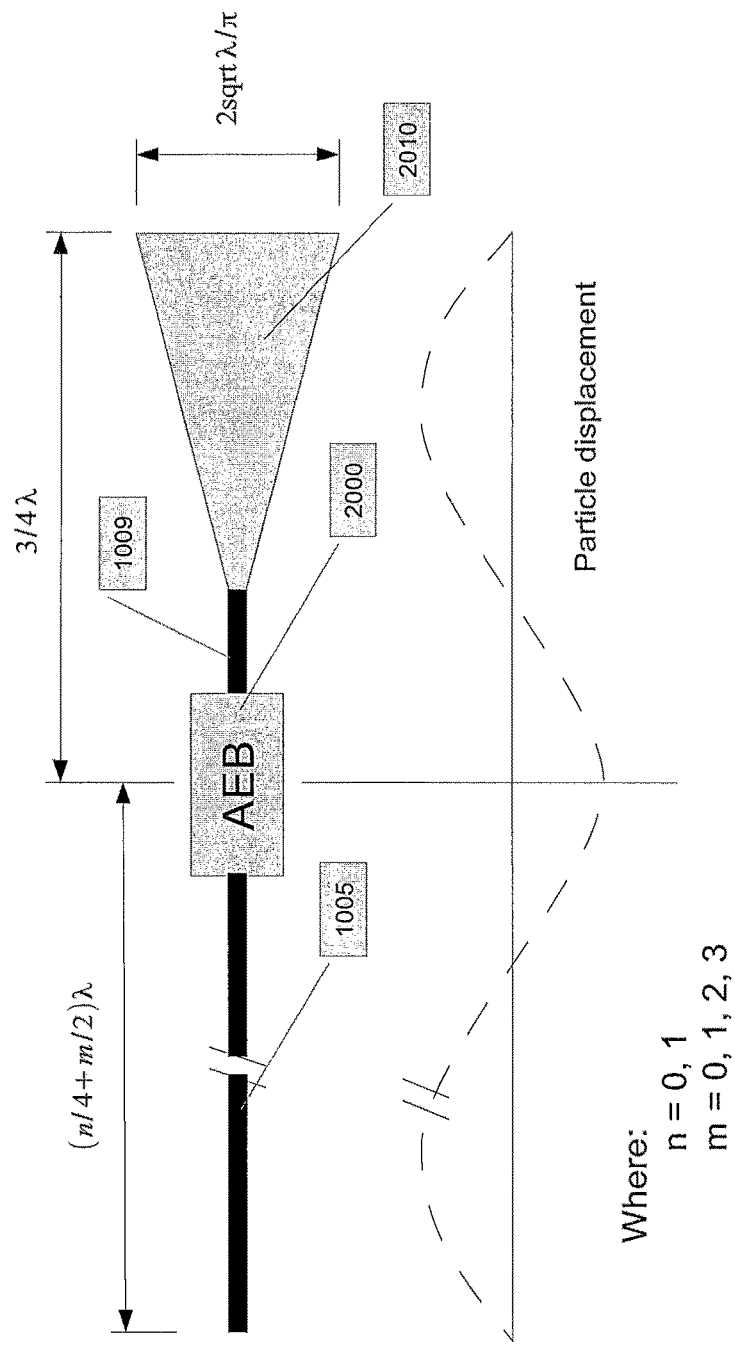
FIG. 3 shows the acoustic waveguide characteristics of the piping leading to the acoustic source and conical horn piping after the acoustic source.
Figure 4:
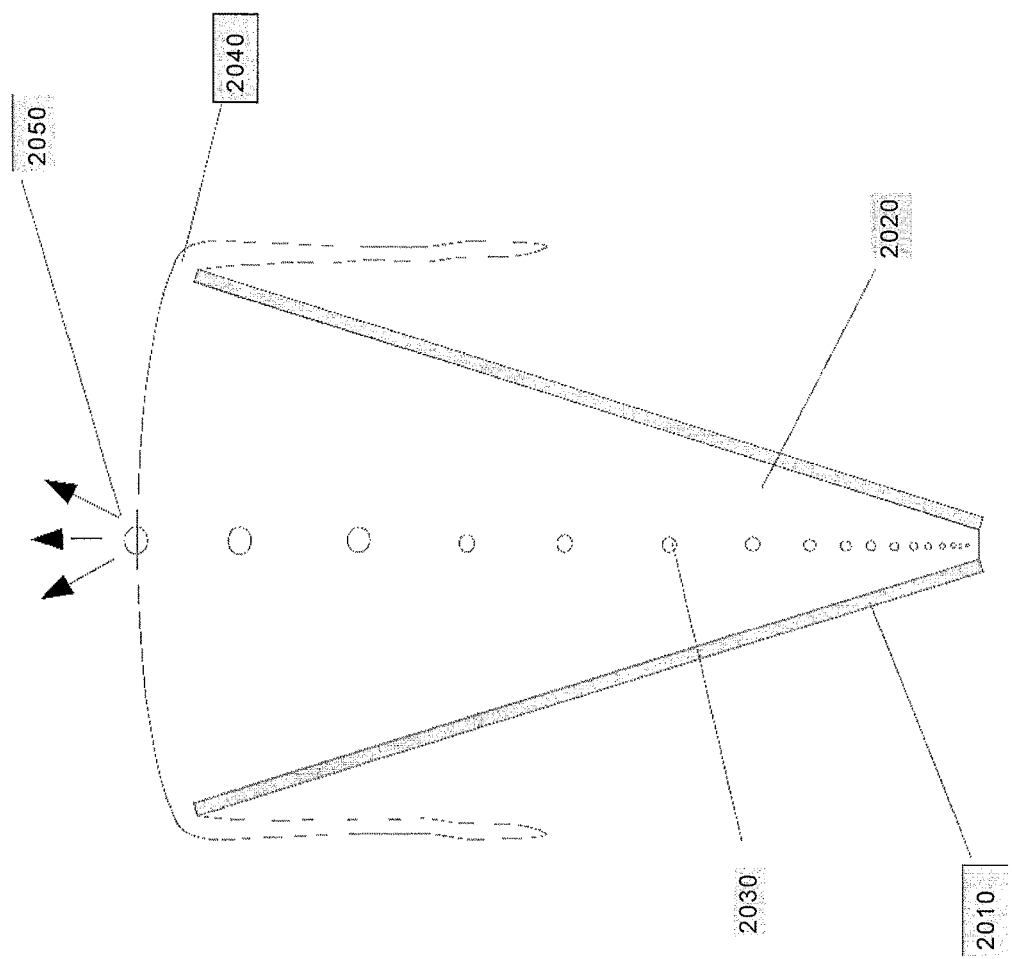
FIG. 4 is a cross sectional view of the diffuser cone and the coalescence of gas phase bubbles within the liquid.

DESCRIPTION OF THE PREFERRED
EMBODIMENT OF THE INVENTION

The present invention of the preferred embodiment for the degassing of high API Gravity and high Reid Vapor Pressure hydrocarbon fluids. The process begins with the input of a heterogeneous fluid which is a multi-phase fluid containing constituent phases including gaseous phases dissolved in the liquid phase. The Liquid (4000) enters the process Accumulator (1000). The fluid under process treatment is stored in the accumulator and discharged via the discharge piping that is fluidly connected to a Flow Control Valve (1010). The Flow Control Valve's (1010) valve position is controlled by means of a Logic Controller (1060). The Logic Controller (1060) is signal connected to a Level Sensor (1050) and a Mass Flow Meter (1007). The Logic Controller performs algorithms based on sensor input of the LEVEL SENSOR (1050) and MASS FLOW METER (1007) to best position the FLOW CONTROL VALVE (1010) valve position. Those skilled in the art know that there are multiple schemes for calculating time-averaged input from the LEVEL SENSOR (1050) and MASS FLOW METER (1007) to maintain a uniform discharge from the Accumulator (1000).

The liquid supply pressure is greater than the internal pressure in the Accumulator (1000), This pressure reduction will cause dissolved gases in the liquid to flash off. Gas discharge from the Accumulator (1000) is fluidly connected via discharge piping (1006) to a Vapor Recovery Unit. Internal pressure within Accumulator (1000) is maintained by a Pressure Control Valve (1040). A Pressure Relief Valve (1030) is fluidly connected to the internal pressure of the Accumulator (1000) to ensure the maximum pressure in the Accumulator (1000) does not exceed design pressure.

An Acoustic Emulsion Breaker (AEB) (2000) is fluidly connected to the MASS FLOW METER (1060), FLOW CONTROL VALVE (1010) and Accumulator (1000). The liquid under process enters an acoustic reaction chamber wherein the fluid under process is exposed to an acoustic signal of a nominal frequency of 900 Hz. The degassing phenomenon is know to occur over a wide range of frequencies from 100 Hz->1M Hz depending upon the acoustic source geometry and architecture. The acoustic signal is preferably a square wave, where those skilled in the art will know that a square wave signal has higher order harmonics that enhance the degassing phenomenon.

Piping (1006) that fluidly connects the AEB (2000) to the MASS FLOW METER (1060) and a DIFFUSER Cone (2010) is preferably designed in such a manner to act as a resonant wave-guide. Those skilled in the art will know that the length of piping will be determined by the appropriate ½ wave-lengths and ¼ wave-lengths depending upon the acoustic boundary conditions of at the inlet pipe (1006) terminus and AEB (2000) discharge Pipe (1009) terminus as well as the proper acoustic phase at the acoustic source.

The DIFFUSION CONE (2010) is preferably oriented in the vertical direction to promote the process of gas/liquid dis-engagement. The Deceleration Cone (2010) is preferably configured such that the exit diameter is approximately $2\sqrt{(\ddot{e}/\eth)}$, where ë is the wavelength, characteristic speed of sound in the fluid under process divided by the primary drive frequency. The shape of the DIFFUSION CONE (2010) can be a linear expansion or any other shape such as exponential, hyperbolic, etc. Those skilled in the art of acoustic horn development will recognize the benefits of the cone geometry.

The DIFFUSION CONE (2010) serves other purposes to decelerate the velocity of the liquid (2020) under process to permit additional time for the coalescence of a plurality of gas phase bubbles in the liquid. Coalescence of the bubbles (2030), preferably increases bubble volume (2050) that increase the Stokes' Law forces and bubble velocity in the vertical direction relative to the liquid. At the terminus of the Diffusion Cone (2010), the liquid velocity is low and the gas velocity is high, thus as the liquid flows over an edge (2040) of the Diffusion Cone (2010), there is a high degree of gas separation (2060) from the liquid phase.

As the liquid is conducted to a Process Tower (3000), the Diffusion Cone terminus (2040) is disposed within a Gas Hat (3040) to channel the liquid into the PROCESS TOWER (3000). The liquid under process is transported to a Liquid Distributor Tray (3030) that is designed to evenly distribute the liquid over a Column Packing (3020). The Liquid Distributor Tray (3030) is configured in a geometry consisting of a circular trough consisting of a distal wall (3031) that is in contact with the internal wall of the PROCESS TOWER (3000), a proximal wall (3032) that has a radius about the longitudinal axis of the PROCESS TOWER (3000) such that an area inside the radius is approximately equal to an area outside the radius to the PROCESS TOWER (3000) internal wall. The proximal wall of the circular trough (3032) height is set at an elevation lower than the distal circular trough wall (3031). Those skilled in the art will recognize that proximal wall (3032) can be configured with serrations (3033) to enhance the spill performance if the PROCESS TOWER (3000) is not set perfectly plumb. A baffle (3034) is disposed between the distal (3031) and proximal (3032) wall. The baffle (3034) is fitted with limber holes (3036) to permit rapid liquid equalization in the Liquid Distributor Tray (3030). Those skilled in the art will recognize that there are a plurality of liquid distributor tray geometries that will uniformly distribute the liquid in the Process Tower (3000) to the Column Packing (3020).

The liquid under process spills from the Liquid Distributor Tray (3030) and overflows the proximal wall (3032) onto Column Packing (3020). Preferably those skilled in the art of distillation and absorber columns will know that the preferred column packing material, geometry, packing height is based upon physical properties of the liquid and gas being processed as well as the mass flow rate of the processed material, stripping gas and the dimensions of the PROCESS TOWER (3000). Those skilled in the art will know that other column packing geometries such as structured and/or random for example, but not limited to Pasig Rings, Saddles, Pall Rings, etc., can be successfully utilized as well.

Processed liquid after descending through the column packing is collected in the base of the PROCESS TOWER (3000). A volume of liquid is retained maintaining a liquid seal. The processed liquid is discharged through a piping 3001 that is fluidly connected to a Flow Control Valve (3050). The Flow Control Valve (3050) is signally connected to a logic controller (3080) that is signally connected to Level Sensor (3080). A signal from the Level Sensor (3080) is used by the logic controller to position the valve in the Flow Control Valve (3080) to maintain a liquid level in the base of the PROCESS TOWER (3000). The output of the Flow Control Valve (3080) is fluidly connected to Tank (4020) storage or additional process steps outside the scope of this invention.

A means of introducing a stripping Gas (4010) into the PROCESS TOWER (3000) comprises a nozzle (3010) that is preferably positioned above the liquid level at the base of the PROCESS TOWER (3000) and below the Column Packing (3010). The stripping gas flows counter to the liquid descending through the Column Packing (3010). The stripping gas nozzle (3010) is fluidly connected via piping to a valve (4050) to throttle and control the gas volume introduced into the PROCESS TOWER (3000). Supply of Gas (4010) is from a source outside of the present invention.

Gas that has been disengaged from the liquid under process is discharged from the PROCESS TOWER (3000). Discharge is accomplished via means 300 comprising pipe 3002) that is fluidly connected to a Pressure Control Valve (3070). The Process Control Valve (4030) is fluidly connected to a Vapor Recovery Unit (4040) that is outside the scope of the present invention. A Pressure Relief Valve (3060) is fluidly connected to the Process Tower (3000) so that pressure within the PROCESS TOWER (3000) does not exceed design limits.

Having thus described the invention in connection with the preferred embodiment thereof, it will be evident to those skilled in the art the various revisions and modifications can be made to the invention described herein without departing from the spirit and scope of the invention. It is my intention, however, that all such revisions and modifications that are obvious to those skilled in the art will be included within the scope of the following.

The invention claimed is:

1. An apparatus for degassing a fluid stream comprising an in-line processing apparatus, said in-line processing apparatus comprising an accumulator configured to lower pressure below an inlet pressure, means for sonic processing, an acoustic wave guide associated with the means for sonic processing, a flow decelerator, and a liquid distributer said means for sonic processing comprising an acoustic emulsion breaker associated with an acoustic reaction chamber wherein the fluid is subjected to at least one acoustic signal and further comprising piping to convey the fluid stream from the acoustic reaction chamber to the liquid distributor comprising means to diffuse where gas may be extracted, said piping designed to act as a resonant waveguide.

2. The apparatus of claim 1 said means to diffuse comprising a diffuser cone, said diffuser cone providing means for gas to escape the fluid stream.

3. The apparatus of claim 1 further comprising a process tower which receives the remaining fluid stream from the diffuser.

4. The apparatus of claim 3 wherein said process tower comprises a liquid distributor tray, column packing, packing support, and counter-flowing stripping gas to enable extraction of additional gas from the fluid.

5. The apparatus of claim 1 for degassing a fluid stream, wherein subjecting the fluid to the acoustic wave guide, changes the momentum of the fluid stream to allow disengagement of said gas bubbles by subjecting the fluid stream to the liquid distributor.

6. The apparatus of claim 5 wherein said distributor comprises a continuous edge over which the fluid flows thereby allowing at least a portion of said gas bubbles to disengage.

7. The apparatus of claim 3 wherein said column further comprises a counter-flowing stripping gas to enable extraction of additional gas.

8. A method for degassing a fluid having a gaseous phase at least partially dissolved in a liquid phase, the method comprising subjecting the fluid to an in-line processing apparatus comprising means to reduce pressure to allow separation of a portion of the gaseous phase and subjecting the remaining fluid to an acoustic emulsion breaker, thereafter flowing the fluid through a diffuser cone to allow separation of a second portion of the gaseous phase.

9. The method of claim 8 further comprising a process tower wherein fluid flowing from the diffuser still comprising at least a portion of the at least partially dissolved gaseous phase is passed through a process column comprising column packing and stripping gas to remove additional gas.

10. A method for degassing a heterogeneous fluid having a gaseous phase at least partially dissolved in a liquid phase, the method comprising employing an in-line processing apparatus and sending said heterogeneous fluid to an accumulator having reduced pressure where at least a portion of the gaseous phase is flashed off and collected, discharging the remaining heterogeneous fluid at a modulated flow rate via discharge piping, to an acoustic emulsion breaker comprising an acoustic reaction chamber where an acoustic signal causes degassing of the heterogeneous fluid, thereafter decelerating the velocity of the remaining heterogeneous fluid and causing at least a portion of said gaseous phase to disengage from the decelerated heterogeneous fluid by allowing the heterogeneous fluid to flow through a diffuser, said gaseous phase channeled by a gas hat to a process tower where it is collected and the remaining heterogeneous fluid moves through a column packing and is subjected to a stripping gas for additional gaseous phase extraction.

* * * * *